Aug. 29, 1967    P. M. RIABOUCHINSKY ET AL    3,338,386
SCRAPER
Filed Sept. 7, 1965
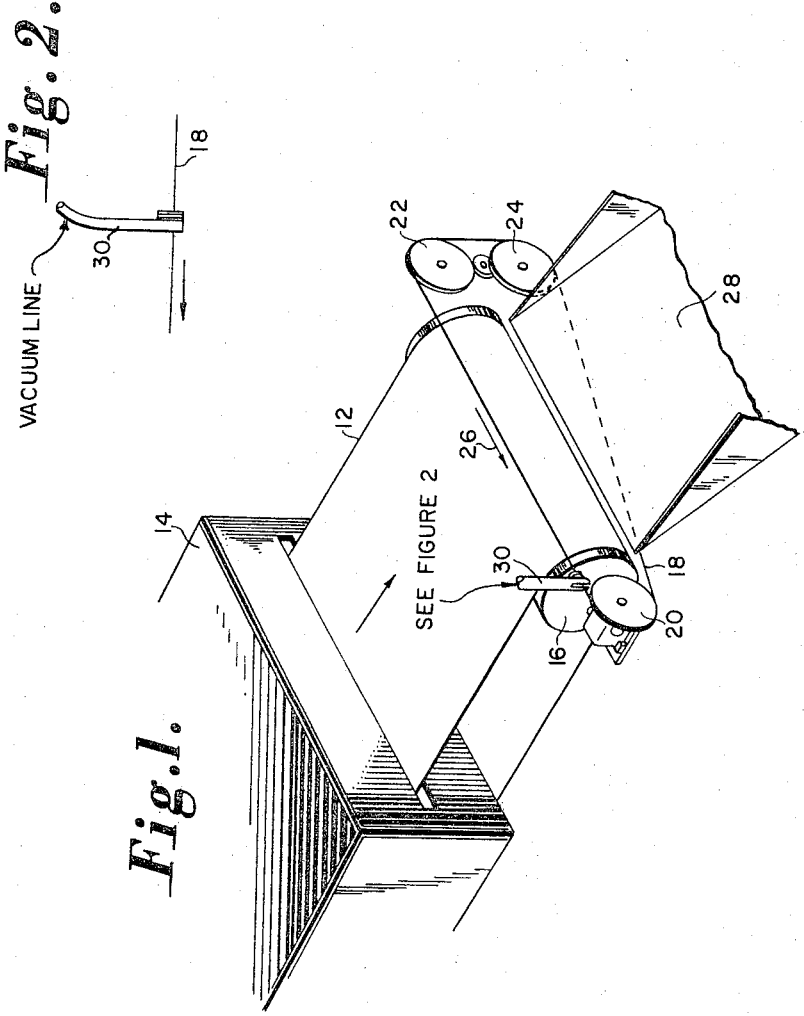
INVENTORS
PAUL M. RIABOUCHINSKY
CLYDE E. FEATHERS
ELDON L. HALL
BY
Milton Zucker
Robert E. Patridge

United States Patent Office 3,338,386
Patented Aug. 29, 1967

3,338,386
SCRAPER
Paul M. Riabouchinsky, Clyde E. Feathers, and Eldon L. Hall, Fredericksburg, Va., assignors to FMC Corporation, New York, N.Y., a corporation of Delaware
Filed Sept. 7, 1965, Ser. No. 485,427
3 Claims. (Cl. 198—230)

ABSTRACT OF THE DISCLOSURE

This application discloses a scraper device for removing material from an endless belt comprising a continuous flexible doctor traveling across the belt and bearing against the belt as the belt passes over the roller, and means to remove adherent material from the doctor after the doctor has passed across the belt.

---

This invention relates to a device for removing an adherent layer of material from a conveyor and aims to provide a scraping device for an endless belt conveyor which is more efficient than conventional blade type scrapers.

There are many devices in which material has to be removed from a continuous belt, as in the drying of various materials, and in filtration devices. The common way of removing material from such a device is a scraping knife which bears up against the belt as it is passing over a drum and removes the bulk of the material from the belt. In most cases this is a satisfactory way of doing the job, but there are situations in which such action is undesirable. For example, when a thermosetting resin is carried on an endless belt through a heating or drying oven, the use of the scraper blade causes some difficulties. Since the resin coming from the oven is warm, the material which builds up along the edge of the scraper blade continues to be warmed by the fresh material being removed from the belt, with the result that the material building up on the edge of the scraper blade becomes over heated or overcured and progressively makes scraping more difficult, as well as contaminating the product or creating lack of uniformity.

We have developed a device for scraping an endless belt which overcomes these difficulties.

This new device comprises a flexible doctor comprising a continuous strand of wire or other flexible material which is driven across the belt at a point where it is traveling over a discharge roller and in contact therewith whereby the traveling flexible doctor serves to loosen the product from the belt. Preferably, the doctor is driven by the driving mechanism for the roll so that its speed is directly proportional to the speed of the roll in whatever ratio is desired. In order to minimize build up on the wire, this speed should preferably be at least that of the belt, up to about twice that of the belt. Higher speeds may be used, but tend to shorten the life of the doctor material. Means are also provided to remove any material adhering to the wire immediately after it passes out of contact with the roll.

In this fashion, the endless belt is continually being contacted with clean doctor surface which carries no residual material on it so that there is no build up of material. Not only is the scraping effect uniform, but there is no opportunity for partially overcured material to be included in the product such as can occur due to breaking off from a knife edge.

The device can be best illustrated by referring to the accompanying drawings in which FIG. 1 is a perspective view of the device and in which FIG 2 is an enlargement of the means for cleaning the doctor after it has left contact with the endless belt.

Referring to the drawings:

An endless belt 12 carrying the product (not shown) on its surface passes through an oven 14 being driven by a roller 16. As it passes over the roll the product is discharged into chute 28 by gravity. However, since at least some of the product adheres to the belt 12, which may be of solid metal or of wire mesh or of any suitable material, it is necessary to have a device which will bear against the surface of the belt as it passes over the roller 16 to remove as much as possible of the material from the belt.

According to the present invention this device comprises an endless flexible doctor 18 driven over wheels 20, 22 and 24 in the direction shown by the arrow 26. Wheels 22 and 24 are idlers, the driving wheel being wheel 20 which is operably connected to the driving device for the roll 16 so that the wire will be driven at a speed which bears a constant ratio to the speed of the roller 16. It will be apparent as the doctor 18 passes by the belt 12 in immediate contact therewith and bearing against the roll 16, it will cut the material on the belt away from the belt.

When this material is a thermosetting resin such as urea formaldehyde resins, and in most other cases, the adhesiveness of the material results in some of it becoming attached to the doctor 18. To overcome this adhesion, we mount on the doctor 18 a hollow tube 30 which is attached to a vacuum line. The tube is mounted immediately between the roll 16 and the driving roller 20 so that the doctor will be cleaned before it gets into its own driving mechanism.

As shown in the drawings, the line 30 is split at its bottom to accommodate the flexible doctor 18, and carries on its inner side abrasive brushes 32 which serve to loosen any material that is adhered to the wire so that it can be sucked up by the vacuum in the line 30.

While any sort of flexible doctor can be used for the line 18, it is difficult to get a material which will stand up for any length of time. A woven galvanized wire appears to be most satisfactory, because it stands up better in use than doctors made of unitary pieces of flexible material.

While we have illustrated one embodiment of the invention, obviously this is for illustrative purposes only and the invention should not be limited thereto, and is defined in the claims.

We claim:
1. A device in combination comprising:
   (a) An endless conveyor belt;
   (b) a roller over which the belt passes;
   (c) driving means for the roller;
   (d) a continuous flexible doctor bearing against the belt as the belt passes over the roller;
   (e) a plurality of wheels over which the continuous flexible doctor passes;
   (f) a drive means operably connected to one of the wheels so that as the wheel turns the doctor travels across the endless belt as the belt passes over the roller; and

(g) means to remove adherent material from the doctor after the doctor has passed across the belt.

2. The device of claim 1 in which the doctor is of woven wire.

3. The device of claim 1 including means to attach the drive means for the doctor to the roller driving means.

References Cited

UNITED STATES PATENTS

| | | | | |
|---|---|---|---|---|
| 648,866 | 5/1900 | Gibford | | 74—230 |
| 1,255,977 | 2/1918 | Bemis | | 198—230 |
| 2,868,504 | 1/1959 | Minty | | 254—186 |
| 2,878,926 | 3/1959 | Harty | | 198—230 |
| 3,139,975 | 7/1964 | Schaefer | | 198—230 |

FOREIGN PATENTS

| | | |
|---|---|---|
| 482,329 | 9/1929 | Germany. |
| 801,144 | 12/1950 | Germany. |

EVON C. BLUNK, *Primary Examiner.*

RICHARD E. AEGERTER, *Examiner.*